United States Patent [19]
Kalz et al.

[11] Patent Number: 5,955,614
[45] Date of Patent: Sep. 21, 1999

[54] BRIDGED PERINONES/ QUINOPHTHALONES

[75] Inventors: Dietmar Kalz, Neunkirchen; Dieter Arlt, Lemgo; Karl-Heinz Reinhardt, Monheim, all of Germany

[73] Assignee: Bayer Aktiengesellschaft, Leverkusen, Germany

[21] Appl. No.: 08/919,834

[22] Filed: Aug. 28, 1997

[30] Foreign Application Priority Data

Sep. 5, 1996 [DE] Germany ............................ 196 36 032
Sep. 5, 1996 [DE] Germany ............................ 196 36 033
Feb. 21, 1997 [DE] Germany ............................ 197 06 900

[51] Int. Cl.$^6$ .............................. C08K 5/34; C09B 25/00
[52] U.S. Cl. .......................................................... 546/173
[58] Field of Search ............................................. 546/173

[56] References Cited

U.S. PATENT DOCUMENTS

| | | |
|---|---|---|
| 3,332,964 | 7/1967 | McCracken et al. . |
| 3,417,048 | 12/1968 | Cooper et al. ............................ 546/173 |
| 3,435,002 | 3/1969 | Holub . |
| 3,622,582 | 11/1971 | Schekczik ................................ 546/173 |
| 3,632,608 | 1/1972 | Holub . |
| 3,749,722 | 7/1973 | Holub . |
| 3,819,632 | 6/1974 | Burdeska . |
| 3,909,442 | 9/1975 | Tucker et al. . |
| 3,965,125 | 6/1976 | Meyers . |
| 4,080,319 | 3/1978 | Caporiccio et al. . |
| 4,167,506 | 9/1979 | Shimada et al. . |
| 4,458,073 | 7/1984 | Marraccini et al. ...................... 546/173 |
| 5,126,462 | 6/1992 | Greber et al. ............................ 549/241 |
| 5,466,805 | 11/1995 | Roschger ................................. 544/245 |

FOREIGN PATENT DOCUMENTS

| | | |
|---|---|---|
| 438382 | 7/1991 | European Pat. Off. . |
| 1075110 | 10/1954 | France . |
| 1564232 | 4/1969 | France . |
| 4435714 | 4/1996 | Germany . |
| 60-166325 | 8/1985 | Japan . |
| 463667 | 11/1968 | Switzerland . |
| 1386846 | 3/1975 | United Kingdom . |

OTHER PUBLICATIONS

Kacens, S., et al Latv. PSR. Zinat. Akao. Vestis, Kim Ser vol. 1969 No. 6 pp. 732–735, 1969.

Kalens, Chem Abstr, vol. 72 entry 111261s, 1970.

B.K. Manukian et al "Chinophthalone" Chimia vol. 24, Nr. 9, 1970, pp. 328–339 XP002073520.

Patent Abstracts of Japan vol. 014 No. 020 (C–676), Jan. 17, 1989.

Chemistry of Heterocyclic Compounds, vol. 30, No. 1 1994, pp. 31–34.

*Primary Examiner*—John M. Ford
*Assistant Examiner*—Bruck Kifle
*Attorney, Agent, or Firm*—Joseph C. Gil; Richard E. L. Henderson

[57] ABSTRACT

Compounds of the general formula (I) or tautomeric forms thereof

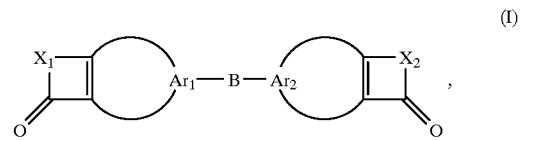

(I)

wherein $Ar_1$ and $Ar_2$ independently of one another denote radicals to complete optionally substituted carbocyclic aromatic rings, B denotes an optionally substituted alkylene group or a radical of the formula

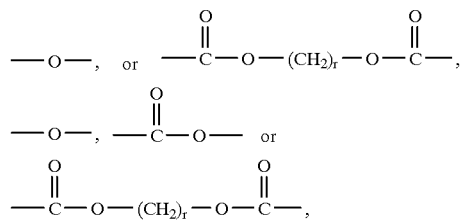

wherein r represents a number from 1 to 4, the ends of which are in each case bonded to an aromatic C atom of the two radicals $Ar_1$ and $Ar_2$, and $X_1$ and $X_2$ independently of one another represent a radical of the formulae chosen from the group consisting of

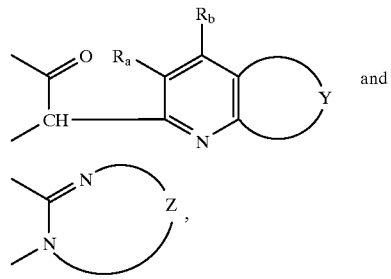

and these being in each case located in the ring such that the

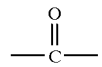

or the

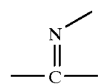

group is adjacent to the C—C double bond, wherein Y, Z, $R_a$ and $R_b$ have the meaning, given in the description, are outstandingly suitable for bulk dyeing of plastics.

13 Claims, No Drawings

BRIDGED PERINONES/QUINOPHTHALONES

The invention relates to bridged perinones, quinophthalones and perinone-quinophthalones, processes for their preparation and their use plastics.

It is known to use perinone dyestuffs, such as are known, for example, from FR-A-1 075 110 or U.S. Pat. No. 5,466,805, for bulk dyeing of plastics.

It is furthermore known to employ quinophthalone dyestuffs, such as are described, for example, in DE-A-44 35 714 or DE-A-21 32 681, for bulk dyeing of plastics.

Such compounds are indeed distinguished by a good temperature stability and high fastness to light, but their fastness to sublimation is still in need of improvement. In the dyeing process, i.e. in the injection moulding machines, undesirable sublimation of the dyestuffs occurs not infrequently at temperatures above 240° C., which contaminates the working equipment, necessitating expensive cleaning measures.

The object of the present invention was therefore to provide perinone and quinophthalone dyestuffs with an improved fastness to sublimation.

Compounds of the general formula (I) or tautomeric forms thereof have been found

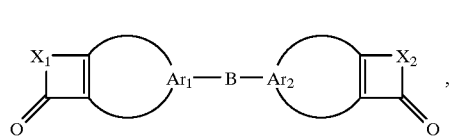

wherein

Ar$_1$ and Ar$_2$ independently of one another denote radicals to complete optionally substituted carbocyclic aromatic rings, B denotes an optionally substituted alkylene group or a radical of the formula

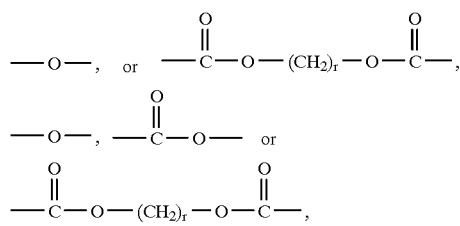

wherein r represents a number from 1 to 4, the ends of which are in each case bonded to an aromatic C atom of the two radicals Ar$_1$ and Ar$_2$, and X$_1$ and X$_2$ independently of one another represent a radical of the formulae chosen from the group consisting of

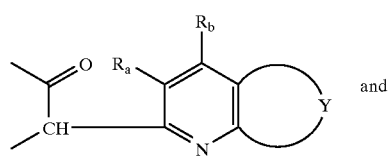

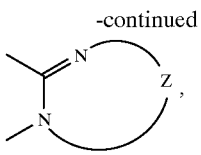

these being in each case located in the ring such that the

or the

group is adjacent to the C—C double bond,
wherein
Y forms the radical of an optionally substituted benzene or naphthalene ring,
Z denotes optionally substituted ortho-phenylene, ortho-naphthylene, peri-(1,8)-naphthylene or arylene comprising more than two benze to one another, the aryl radicals which contain more than two benzene rings fused to one another being bridged in the ortho-position or corresponding to a peri-position in naphthalene,
R$_a$ denotes H or OH and
R$_b$ denotes H or halogen, in particular F, Br and Cl.

The peri-position actually corresponds to the 1,8-position in naphthalene. Both in the literature and in the context of the present application, however, this meaning is also extended to arylenes which contain more than two benzene rings fused to one another.

Possible substituents of Z which may be mentioned are, for example: C$_1$–C$_6$-alkyl, halogen, nitro, aryl, aryloxysulphonyl, hydroxyl, C$_1$–C$_6$-alkoxy, aryloxy, amino which is optionally substituted by alkyl or acyl, aminosulphonyl which is optionally substituted by alkyl or aryl, or a fused-on cycloaliphatic or heterocyclic ring.

Preferred substituents are: chlorine, bromine, nitro, methoxy, NH$_2$, benzyloxy, hydroxyl, —SO$_2$O(C$_6$H$_5$), —SO$_2$N(CH$_3$)$_2$, —SO$_2$NHCH$_3$, methyl, ethyl, n-propyl, iso-propyl, n-, sec- or tert-butyl, NHCOCH$_3$, —N(C$_2$H$_5$)$_2$ or optionally substituted phenyl.

Possible substituents of the benzene or naphthalene radical completed by Y which may be mentioned are, for example: halogen, in particular Cl and Br, —COOH, —COOR, wherein R represents C$_1$–C$_{10}$-, preferably C$_1$–C$_4$-alkyl, in particular methyl and ethyl, C$_6$–C$_{10}$-aryl or C$_5$–C$_8$-cycloalkyl, and C-C$_6$-alkyl, in particular denotes methyl.

Possible substituents of the carbocyclic aromatic ring completed by Ar$_1$ and Ar$_2$ which may be mentioned are, for example: C$_1$–C$_6$-alkyl, in particular methyl, ethyl, n-propyl, iso-propyl and n-, sec- and tert-butyl, halogen, in particular Cl and Br, alkyl- and arylcarbonyl, alkyl- and arylsulphonyl, nitro, aryl, in particular optionally substituted phenyl, aryloxysulphonyl, in particular —SO$_2$OC$_6$H$_5$, hydroxyl, C$_1$–C$_6$-alkoxy, such as methoxy or benzyloxy, aryloxy, such as phenoxy, amino which is optionally substituted by alkyl or acyl, such as NH$_2$, NHCOCH$_3$ and —N(C$_2$H$_5$)$_2$, aminosulphonyl which is optionally substituted by alkyl or aryl, such as SO$_2$N(CH$_3$)$_2$ and SO$_2$NHCH$_3$, or a fused-on cycloaliphatic or heterocyclic ring.

Ar$_1$ and Ar$_2$ independently of one another particularly preferably denote a radical to complete an optionally substituted benzene or naphthalene ring, in particular an optionally substituted benzene ring.

CF$_3$ may be mentioned as an example of a possible substituent of the alkylene group B, which can be either straight-chained or branched.

Particularly preferred compounds of the formula (I) are those which correspond to the formula (II) or tautomeric forms thereof

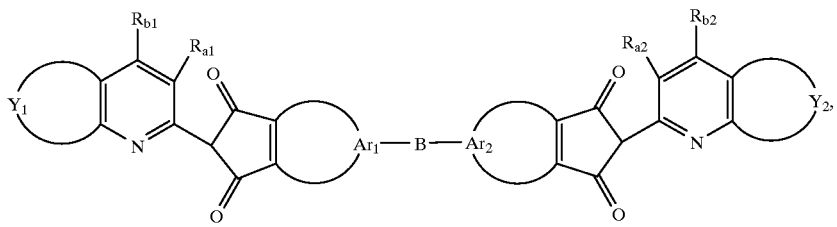

(II)

wherein
- Y$_1$ and Y$_2$ independently of one another form the radical of an optionally substituted benzene or naphthalene ring,
- R$_{a1}$ and R$_{a2}$ independently of one another denote H or OH,
- R$_{b1}$ and R$_{b2}$ independently of one another denote H or halogen, in particular F, Br or Cl, and
- Ar$_1$, Ar$_2$ and B have the abovementioned meaning.

Possible substituents for the radicals Y$_1$ and Y$_2$ which may be mentioned are, for example, those mentioned for the radical Y.

R$_{b1}$ and R$_{b2}$ particularly preferably each denote hydrogen.

Particularly preferred compounds of the formula (II) are those which correspond to the formula (IIa) or tautomeric forms thereof R$_{a1}$ and R$_{a2}$ have the abovementioned meaning, and preferably represent OH, and B has the abovementioned meaning.

The preferred meaning of B is an optionally substituted C$_1$–C$_5$-alkylene group and the radical of the formula

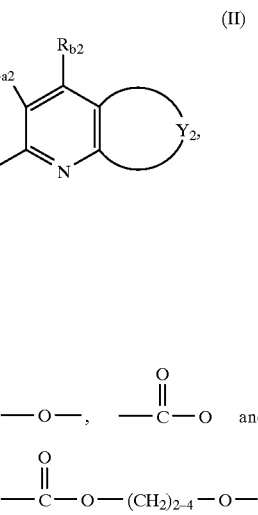

Radicals which are to be mentioned in particular here are:

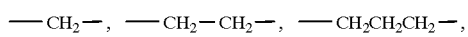

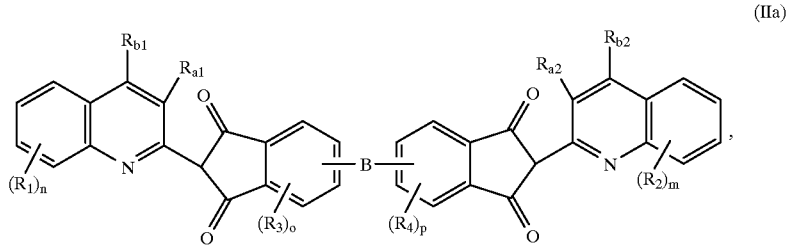

(IIa)

wherein
- n and m independently of one another represent a number from 0 to 4,
- R$_1$ and R$_2$ independently of one another each have the same or different meanings such as are mentioned for the substituents of the radical completed by Y$_1$ and Y$_2$,
- o and p independently of one another denote a number from 0 to 2, in particular 0 or 1,
- R$_3$ and R$_4$ independently of one another can each assume the same or different meanings such as are mentioned for the substituents of the carbocyclic aromatic rings completed by Ar$_1$ and Ar$_2$,
- R$_{b1}$ and R$_{b2}$ have the abovementioned meaning, and preferably represent H, -continued

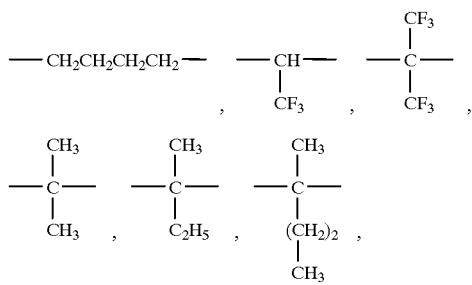

-continued

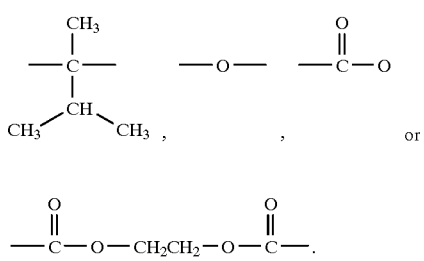

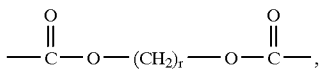

B especially preferably represents —CH$_2$—, —CH(CF$_3$)—, —C(CF$_3$)$_2$— or

—C(CH$_3$)$_2$—, —O—, —C(O)—O— or

—C(O)—O—CH$_2$CH$_2$—O—C(O)—

Especially preferred compounds of the formula (II) are those in which $Y_1=Y_2$
$R_{a1}=R_{a2}$
$R_{b1}=R_{b2}$ and
$Ar_1=Ar_1$.

Correspondingly advantageous compounds of the formula (IIa) are those wherein n=m
$R_1=R_2$
$R_{a1}=R_{a2}$
$R_{b1}=R_{b2}$
o =p and
$R_3=R_4$, wherein, in particular,
n, m, o and p represent 0.

The optionally substituted alkylene group and the radicals of the formulae

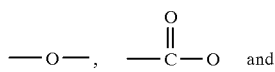 and

—C(O)—O—(CH$_2$)$_r$—O—C(O)—, wherein r has the above meaning, in the meaning of B are preferably bonded with their ends in each case to the respective aromatic radicals Ar$_1$ and Ar$_2$ in the para-position relative to a carbonyl group.

Particularly preferred compounds of the formula (II) are those which correspond to the formula (IIb) or tautomeric forms thereof

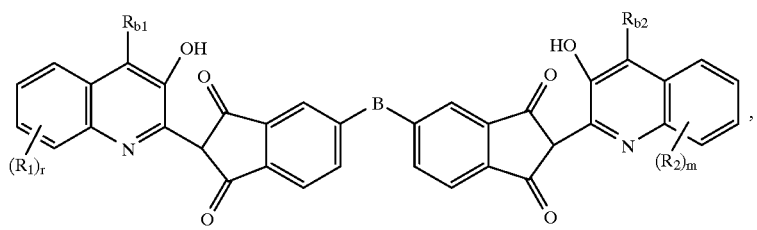

(IIb)

wherein n, m, R$_1$, R$_2$, R$_{b1}$, R$_{b2}$ and B have the abovementioned meanings.

The compounds of the formula (I) according to the invention are distinguished by an outstanding fastness to sublimation during bulk dyeing of plastics. They also have a very good fastness to light, good heat stability and a particularly high tinctorial strength. A tinctorial strength comparison of, for example, the compounds of the formula (II) with the non-doubled quinophthalones shows a more than additive increase, which reveals a synergistic effect.

A particular advantage of the symmetrically bridged quinophthalones of the formula (II), that is to say wherein Y$_1$=Y$_2$, R$_{a1}$=R$_{a2}$, R$_{b1}$=R$_{b2}$ and Ar$_1$=Ar$_2$, over the quinophthalones which are not doubled via the bridge member B lies in the fact that, with a virtually identical colour shade of the doubled system and the non-doubled system, the tinctorial strength of the quinophthalones according to the invention is as a rule significantly higher when the same amount is employed.

If the quinophthalones of the formula (II) according to the invention have different meanings for Y$_1$ and Y$_2$ and/or R$_{a1}$ and R$_{a2}$ and/or Ar$_1$ and Ar$_2$, it may be advantageous for the mixtures of symmetric and asymmetric quinophthalones possibly formed as a result of the preparation to be used for the intended purpose.

Compounds of the formula (I) which are likewise preferred are those which correspond to the formula (III) or tautomeric forms thereof

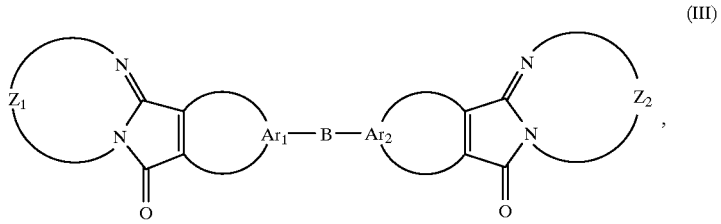

(III)

wherein

Z₁ and Z₂ independently of one another denote optionally substituted ortho-phenylene, ortho-naphthylene, peri-(1,8)-naphthylene or arylene comprising more than two benzene rings fused to one another, wherein the aryl radicals which contain more than two benzene rinds fused to one another are bridged in the ortho-position or corresponding to a peri-position in naphthalene, and Ar₁, Ar₂ and B have the abovementioned meanings.

Possible substituents for the radicals Z₁ and Z₂ which may be mentioned are, for example, those mentioned for the radical Z.

Particularly preferred radicals Z₁ and Z₂ independently of one another correspond to an optionally substituted peri-(1,8)-naphthylene.

Compounds of the formula (III) which are particularly preferred are those which correspond to the formula (IIIa)

R₃ and R₄ independently of one another are in each case identical or different and can assume the meaning of the substituents mentioned for the radicals Z₁ and Z₂, and in particular denote halogen, NO₂, —NH-acyl or —NH-alkyl and B has the abovementioned meaning The preferred meaning of B corresponds to that given above.

Especially preferred compounds of the formula (III) are those
wherein
    Z₁=Z₂ and
    Ar₁=Ar₂.

Compounds of the formula (III) which are correspondingly advantageous are those
wherein
    n₁=m₁,
    R₅=R₆,

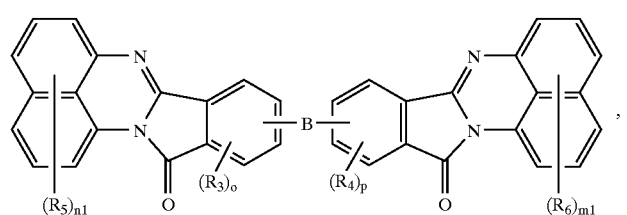

(IIIa)

wherein n₁ and m₁ independently of one another represent a number from 0 to 4,

R₅ and R₆ independently of one another are in each case identical or different and can assume the meaning of the substituents mentioned for the radicals Z₁ and Z₂, and in particular represent halogen and C₁–C₆-alkyl, o and p independently of one another denote a number from 0 to 2, in particular 0 or 1, o=p and
R₃=R₄, wherein, in particular, n₁, m₁, o and p represent 0.

The optionally substituted alkylene group in the meaning of B is preferably bonded to the respective aromatic radical Ar₁ or Ar₂ in the para-position relative to a carboxyl group.

Compounds of the formula (III) which are particularly preferred are those which correspond to the formula (IIIb)

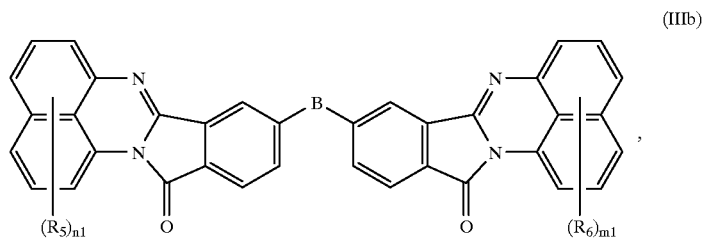

(IIIb)

wherein $n_1$, $m_1$, $R_5$, $R_6$ and B have the abovementioned meanings.

The compounds of the formula (III) according to the invention are likewise distinguished by an outstanding fastness to sublimation in the bulk dyeing of plastics. They also have a very good fastness to light, good heat stability and a particularly high tinctorial strength. A tinctorial strength comparison with the non-doubled perinone shows, for example, more than an additive reveals a synergistic effect.

A particular advantage of the symmetric perinones of the formula (III), that is to say wherein $Z_1$,=$Z_2$ and $Ar_1$=$Ar_2$, over the perinones which are riot doubled via the bridge member B lies in the fact that, with a virtually identical colour shade of the doubled system and the non-doubled system, the tinctorial strength of the perinones according to the invention is as a rule significantly higher when the same amount is employed.

If the perinones of the formula (III) according to the invention have different meanings for $Z_1$ and $Z_2$ and/or for $Ar_1$ and $Ar_2$, it may be advantageous for the mixtures of symmetric and asymmetric perinones of the formula (III) possibly formed as a result of the preparation to be used for the intended purpose.

Compounds of the formula (I) which are also preferred are those which correspond to the formula (IV) or tautomeric forms thereof

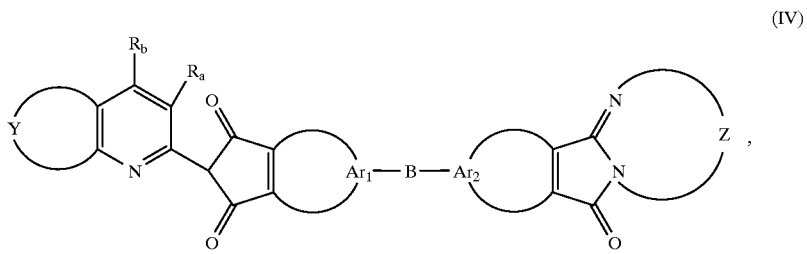

(IV)

wherein

Y, Z, $R_a$, $R_b$, $Ar_1$, $Ar_2$ and B have the abovementioned meaning.

Compounds of the formula (IV) which are particularly preferred are those which correspond to the formula (IVa) or tautomeric forms thereof

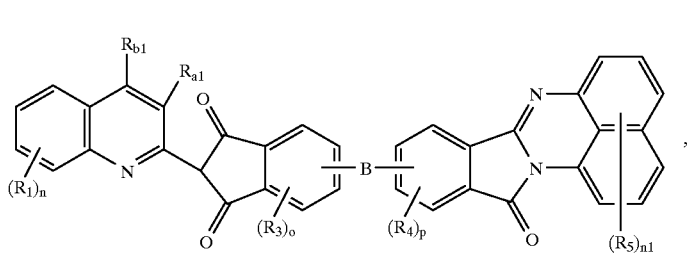

(IVa)

wherein $R_1$, $R_3$, $R_4$, $R_5$, $R_{b1}$, $R_{a1}$, B, n, p and $n_1$ have the abovementioned meanings.

Compounds of the formula (IV) which are especially preferred are those which correspond to the formula (IVb) or tautomeric forms thereof

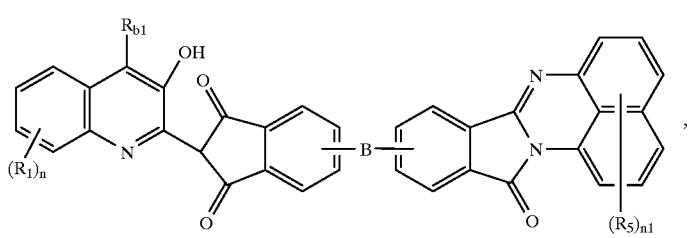
(IVb)

wherein $R_1$, $R_5$, $R_{b1}$, B, n and $n_1$, have the abovementioned meaning.

The compounds of the formula (IV) according to the invention are likewise distinguished by an outstanding fastness to sublimation in the bulk dyeing of plastics. They also have a very good fastness to light, good heat stability and a particularly high tinctorial strength.

The heat stability is very good at 300° C. and significantly above this.

Mixtures resulting from the preparation which comprise compounds of the formula (IV) and those of the formulae (II) and (III) are particularly preferred. Especially advantageous mixtures are those which, in addition to the compound of the formula (IV), comprise 0 to 25% by weight of a compound of the formula (II) and 0 to 25% by weight of a compound of the formula (III), the sum of the compounds (IV), (II) and (III) being 100%.

The invention furthermore relates to a process for the preparation of the compounds of the formula (I) according to the invention, which is characterized in that tetracarboxylic acids or anhydrides thereof, of the formula (V)

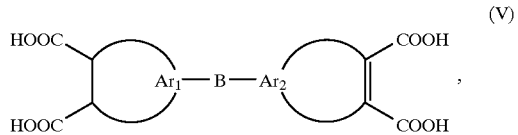
(V)

wherein $Ar_1$, $Ar_2$ and B have the abovementioned meaning, are subjected to a condensation reaction with one or more compounds of the formulae (VI) and/or (VII)

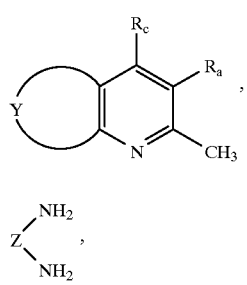
(VI)

(VII)

wherein $R_c$ denotes H, COOH or halogen, in particular F, Br and Cl, in particular represents H or COOH, and Y, Z and $R_a$ have the abovementioned meaning, the sum of the compounds of the formulae (VI) and (VII) corresponding to two molar equivalents, based on the tetracarboxylic acid (V).

The indication of the molar equivalents of the reactants employed for the preparation of the compound (I) serves merely to indicate the stoichiometry and does not exclude larger or smaller amounts which may be more appropriate industrially.

The sum of the compounds of the formulae (VI) and (VII) employed can of course also be more than 2 molar equivalents, based on the tetracarboxylic acid (V) or anhydrides thereof. However, it is preferable to use stoichiometric amounts.

The condensation reaction can be carried out here directly by melting equimolar amounts of the components of the formulae (V) and (VI) and/or (VII) together at a temperature of 120° C. to 250° C., or more advantageously by reaction in a solvent at a temperature of 110° to 220° C., if appropriate under pressure, it being possible for the water of reaction to be removed by distillation.

Suitable solvents are, for example: chlorobenzene, o-dichlorobenzene, trichloro-benzene, xylene, dimethylformamide, N-methylpyrrolidone, glacial acetic acid, propionic acid, phenol, cresols, phenoxyethanol, glycols and mono- and dialkyl ethers thereof, alcohols, for example methanol, ethanol and i-propanol, water and aqueous solvents such as, for example, dilute sulphuric acid, etc.

If appropriate, the reaction can be carried out with the addition of an acid catalyst.

Suitable catalysts are, for example: zinc chloride, p-toluenesulphonic acid, hydrochloric acid, sulphuric acid, organic acids etc.

The tetracarboxylic acid of the formula (V) is particularly preferably employed in the form of its anhydride.

Compounds of the formula (V) which are preferably employed in the process according to the invention are those which correspond to the formula (Va) or anhydrides thereof

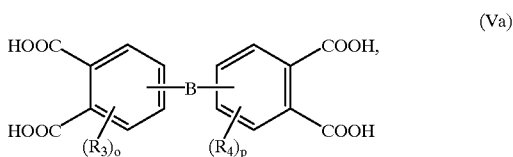
(Va)

wherein $R_3$, $R_4$, B, o and p have the abovementioned meanings.

Compounds of the formula (V) which are especially preferably employed are those which correspond to the formula (Vb) or anhydrides thereof

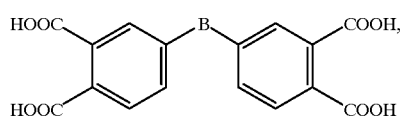
(Vb)

wherein

B represents —CH$_2$—, —CH(CF$_3$)—, —C(CF$_3$)$_2$—, —C(CH$_3$)$_2$—, —O—,

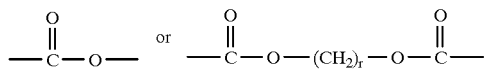

where r=2–4

Compounds of the formula (V) are known in some cases from JP-A-60 166 325, DE-A 2,337,631 (counterpart of U.S. Pat. No. 4,080,319) and Chem. Heterocycl. Comp. 30, 1994, pages 31–34 and U.S. Pat. No. 3,332,964.

Preferred compounds of the formula (VI) are quinaldines of the formula (VIa)

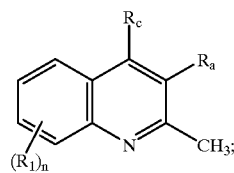
(VIa)

wherein

R$_1$, R$_c$, R$_a$ and n have the abovementioned meaning.

Suitable quinaldines of the formula (VIa) are, for example, those of the formulae mentioned below:

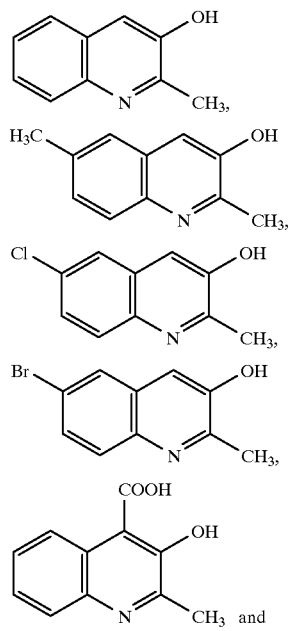

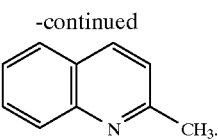

The diamines of the formula (VII) are known or can be prepared, for example, analogously to known diamines.

Preferred aromatic diamines of the formula (VII) are: o-phenylenediamine, chloro-o-phenylenediamines, dichloro-o-phenylenediamines, methyl-o-phenylenediamines, ethyl-o-phenylenediamines, methoxy-o-phenylenedi-amines, acetamino-o-phenylenediamines, phenyl-o-phenylenediamines, naphthylene-o-diamines, furthermore 1,8-naphthylene-diamine, chloro-1,8-naphthylenediamines, dichloro-1,8-naphthylenediamines, methyl-1,8-naphthylenediamines, dimethyl-1,8-naphthylenediamines, methoxy-1,8-naphthylenediamines, ethoxy-1,8-naphthylenediamines, acetamino-1,8-naphthylenediamines and 1,8-diaminoacet-naphthylene.

In another preferred process variant, an optionally substituted peri-naphthylene-diamine is employed as the compound of the formula (VII), in particular 1,8-naphthylenediamine.

A preferred process is the process according to the invention for the preparation of compounds of the formula (I) which correspond to the formula (II), which is characterized in that tetracarboxylic acids or anhydrides thereof, of the formula (V) are subjected to a condensation reaction with compounds of the formulae (VIb) and/or (VIc)

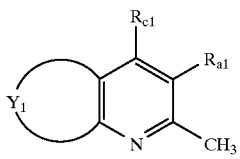
(VIb)

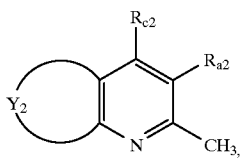
(VIc)

wherein

R$_{c1}$ and R$_{c2}$ independently of one another denote H, COOH or halogen, in particular F, Br and Cl, and in particular represent H or COOH, and R$_{a1}$, R$_{a2}$, Y$_1$ and Y$_2$ have the abovementioned meaning, the sum of the compounds (VIb) and (VIc) corresponding to two molar equivalents, based on the tetracarboxylic acid (V).

The condensation reaction can be carried out here directly by melting equimolar amounts of the components of the formulae (V) and (VIb) and/or (VIc) together at a temperature of 160° to 250° C., preferably 180 to 220° C. particularly preferably 190 to 200° C., or more advantageously can be carried out by reaction in a solvent at a temperature of 110° C. to 220° C., preferably 160 to 180°, if appropriate under pressure, it being possible for the water of reaction to be removed by distillation.

Preferred compounds of the formula (VIb) and (VIc) are quinaldines of the formula (VIbb)

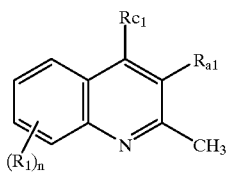
(VIbb)

and of the formula (VIcc)

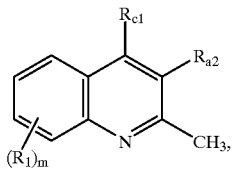
(VIcc)

wherein
R$_1$, R$_2$, R$_{c1}$, R$_{c2}$, R$_{a1}$, R$_{a2}$, n and m have the abovementioned meaning.

A reaction batch for the preparation of the compounds of the formula (II) is preferably worked up by dilution with alcohols, such as methanol, ethanol, propanol or butanol. Aromatic diluents, such as chlorobenzene or toluene, can also be used. This process according to the invention preferably gives the compound according to the invention in yields of 85 to 95% of theory.

If appropriate, the condensation reaction can be followed by a halogenation, in particular chlorination or bromination, this being carried out under conditions known per se. Thus, for example, the bromination of compounds of the formula (II) where $R_{b1}=R_b=H$ in glacial acetic acid at a temperature of 80 to 120° C. leads to compounds of the formula (II) wherein $R_{b1}$ and $R_{b2}$ denote bromine.

The process according to the invention is also preferably suitable for the preparation of the compounds of the formula (I) which correspond to the formula (III), which is characterized in that tetracarboxylic acids or anhydrides thereof, of the formula (V), are subjected to a condensation reaction with compounds of the formulae (VIIa) and/or (VIIb)

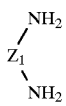
(VIIa)

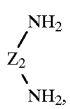
(VIIb)

wherein the sum of the diamines (VIIa) and (VIIb) employed corresponds to two molar equivalents, based on the tetracarboxylic acid (V), and $Z_1$ and $Z_2$ have the abovementioned meaning.

The condensation reaction for the preparation of compounds of the formula (III) can be carried out here directly by melting equimolar amounts of the components of the formulae (V) and (VIIa) and/or (VIIb) together at a temperature of 120° C. to 250° C., preferably at 120 to 180° C., or more advantageously can be carried out by reaction in a solvent at a temperature of 120 to 220° C., preferably at 120 to 180° C., if appropriate under pressure, it being possible for the water of reaction to be removed by distillation.

Compounds of formula (III) which optionally carry substituents from the group consisting of alkyl- and arylaminosulphonyl radicals can be prepared, for example, from the corresponding compounds of the formula (III) in which one substituent denotes a chlorosulphonyl radical with alkyl- or arylamines.

Compounds of the formula (III) according to the invention in which one substituent is an aryloxysulphonyl radical can also be obtained by reaction of the corresponding chlorosulphonyl dyestuffs with phenols or naphthols in the presence of a base, for example pyridine, triethylamine or alkali metal or alkaline earth metal carbonates, hydroxides or oxides.

Compounds of the formula (III) in which substituents represent alkyloxy or acyloxy can additionally be prepared by alkylation or acylation of the compounds according to the invention which carry a hydroxyl group.

Those compounds of the formula (III) with an optionally acylated or alkylated amino group can furthermore be obtained by reduction of the corresponding compounds in which the corresponding substituent represents a nitro group with customary reducing agents, for example iron, zinc, sodium sulphide, hydrogen, etc., and if appropriate subsequent acylation or alkylation. The acylation step can also be carried out in the course of the reduction by addition of an acylating agent.

The reaction batch for the preparation of compounds of the formula (III) is preferably worked up by dilution with alcohols, such as methanol, ethanol, propanol or butanol. Aromatic diluents, such as chlorobenzene or toluene, can also be used. The process according to the invention preferably gives the compounds according to the invention in yields of 90 to 95% of theory.

The process according to the invention is also preferable for the preparation of compounds of the formula (I) which correspond to the formula (IV), which is characterized in that tetracarboxylic acids or anhydrides thereof, of the formula (V), are subjected to a condensation reaction with compounds of the formula (VI) and diamines of the formula (VII), the substituents of the compounds mentioned having the abovementioned meanings and the sum of the compounds of the formulae (VI) and (VII) being two molar equivalents, based on the tetracarboxylic acid (V). Preferred compounds of the formulae (V) to (VII) are those mentioned above.

The ratio of the compounds (VI) and (VII) to one another can vary within wide limits. It is, for example, (VI) to (VII)=10:90 to 90:10. The ratio is preferably about 1:1.

The condensation reaction can be carried out here directly by melting equimolar amounts of the components of the formulae (V) and (VI) and (VII) together at a temperature of 160° C. to 250° C., preferably 180 to 220° C., particularly preferably 190 to 200° C., or more advantageously can be carried out in a solvent at a temperature of 110° C. to 220° C., preferably 160 to 180° C., if appropriate under pressure, it being possible for the water of the reaction to be removed by distillation.

The invention furthermore relates to compounds of the formula (V) or anhydrides thereof, in which Ar$_1$ and Ar$_2$ have the abovementioned meaning and
B denotes a radical of the formula

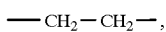

-continued

—CH$_2$CH$_2$CH$_2$—,

—CH$_2$CH$_2$CH$_2$CH$_2$—,

—CH—,
   |
   CF$_3$

    CH$_3$
    |
—C—,
    |
    C$_2$H$_5$

    CH$_3$
    |
—C—,
    |
    (CH$_2$)$_2$
    |
    CH$_3$

    CH$_3$
    |
—C—,
    |
    CH
   / \
 CH$_3$  CH$_3$

—O—   or

    O
    ‖
—C—O—,

Preferred compounds of the formula (V) according to the invention correspond to the preferred forms already mentioned above, i.e. the formula (Va) or (Vb) with the corresponding meanings of substituents, wherein B has the scope of meaning given for the compounds of the formula (V) according to the invention.

The invention furthermore relates to a process for the preparation of the compounds of the formula (V), which is characterized in that dichlorides of the formula (VIII)

Cl—B—Cl (VIII)

are reacted with dimethyl compounds of the formula (IXa) and/or (IXb)

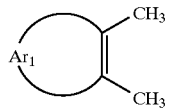
(IXa)

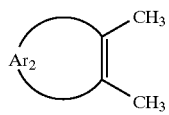
(IXb)

under Friedel-Crafts conditions, the amount of the compounds (IXa) and (IXb) employed together making up at least two molar equivalents per mole of the compound (VIII), and the resulting reaction product is then oxidized, Ar$_1$, Ar$_2$ and B having the broadest meaning given above.

A preferred compound of the formula (IXa) or (IXb) is o-xylene. Nitric acid may be mentioned as the preferred oxidizing agent.

The compounds of the formula (I) according to the invention are outstandingly suitable for dyeing plastics in bulk.

Bulk dyeing here is understood as meaning, in particular, processes in which the dyestuff is incorporated into the molten plastics composition, for example with the aid of an extruder, or in which the dyestuff is added to starting components for the preparation of the plastic, for example monomers, even before the polymerization.

Particularly preferred plastics are thermoplastics, for example vinyl polymers, polyesters and polyamides, as well as polyolefins, in particular polyethylene and polypropylene.

Suitable vinyl polymers are polystyrene, styrene/acrylonitrile copolymers, styrene/butadiene copolymers, styrene/butadiene acrylonitrile terpolymers, polymethacrylate, polyvinyl chloride and the like.

Polyesters which are furthermore suitable are: polyethylene terephthalates, poly-carbonates and cellulose esters.

Polystyrene, styrene copolymers, polycarbonates and polymethacrylates are preferred. Polystyrene, polyethylene and polypropylene are particularly preferred.

The high molecular weight compounds mentioned can be present individually or as mixtures, as plastic compositions or as melts.

The dyestuffs according to the invention are used in finely divided form, it being possible but not essential to co-use dispersing agents.

If the compounds (I) are employed after the polymerization, they are mixed or ground with the granules of the plastic in the dry state and this mixture is plasticized and homogenized, for example on mixing rolls or in extruders. However, the dyestuffs can also be added to the molten composition and distributed homogeneously by stirring. The material predyed in this way is then further processed in the customary manner, for example by spinning to bristles, threads and the like, or by extrusion or in the injection moulding process to give mouldings.

Since the dyestuffs of the formula (I) are resistant to polymerization catalysts, in particular peroxides, it is also possible to add the dyestuff to the monomeric starting materials for the plastics and then to carry out the polymerization in the presence of polymerization catalysts. To this end the dyestuffs are preferably dissolved in the monomeric components or mixed intimately with them.

The dyestuffs of the formula (I) are preferably employed for dyeing the polymers mentioned in amounts of 0.0001 to 1% by weight, in particular 0.01 to 0.5% by weight, based on the amount of polymer.

Corresponding valuable opaque dyeings can be obtained by addition of pigments which are insoluble in the polymers, such as, for example, titanium dioxide.

Titanium dioxide can be used in an amount of 0.01 to 10% by weight, preferably 0.1 to 5% by weight, based on the amount of polymer.

Mixtures of various dyestuffs of the formula (I) and/or mixtures of dyestuffs of the formula (I) with other dyestuffs and/or inorganic or organic pigments can also be employed according to the process of the invention.

The compounds of the formula (II) are yellow, those of the formula (III) are red and those of the formula (IV) are orange.

The invention is explained by, but not limited to, the following examples, in which the parts are stated in terms of weight. Percentage data denotes percentages by weight (% by wt.).

EXAMPLES

EXAMPLE 1

20 g (0.14 mol) of quinaldine of the formula

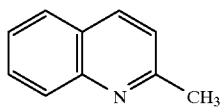

and 18.5 g (0.058 mol) of 4,4'-isopropylidenediphthalic acid dianhydride were added to 150 g (1.6) mol of phenol and the mixture was heated to 175° C. During this procedure, water of reaction distilled off. The reaction temperature was maintained for 12 hours. Thereafter, the reaction mixture was allowed to cool to 100° C. and 350 ml of ethanol were slowly added over a period of about 1 hour. As soon as the temperature had fallen to 65 to 70° C., the temperature was maintained. The mixture was then allowed to cool to room temperature. The crystalline precipitate was filtered off with suction and washed several times with warm methanol. Finally, it was washed with hot water and dried at 70° C. in vacuo.

Yield: 29.3 g=91% of theory.

The dyestuff has the formula

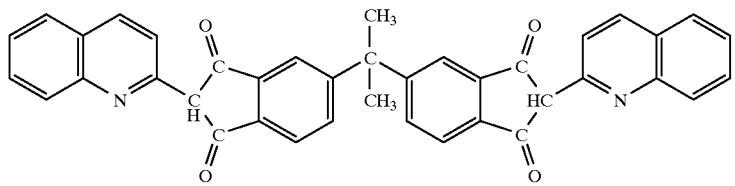

The tinctorial strength of this dyestuff is about 5% higher than that of the non-doubled dyestuff of the formula

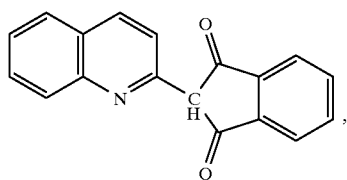

based in each case on equal amounts by weight. The sublimation, determined via thermogravimetric analysis (TGA) at 300° C., of the doubled dyestuff is significantly lower than in the case of the unbridged dyestuff of the above formula.

It dyes polystyrene in bulk in clear greenish-yellow shades with good fastnesses.

EXAMPLE 2

26.4 g (0.14 mol) of 3-hydroxyquinaldine-4-carboxylic acid of the formula

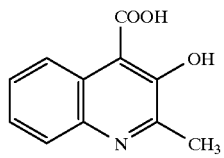

and 18.5 g (0.058 mol) of 4,4'-isopropylidenediphthalic acid dianhydride were added to 150 ml (1.6 mol) of phenol of 80° C., while stirring, and the mixture was heated to 175° C. and kept at this temperature for 12 hours. During this procedure, water of reaction distilled off, and carbon dioxide was split off from the 3-hydroxyquinaldine-4-carboxylic acid. The mixture was then cooled to 100° C., 250 ml of methanol were added in the course of about 1 hour and the mixture was cooled to room temperature. The crystalline precipitate was filtered off and washed with 500 ml of methanol and then with 500 ml of hot softened water. The dyestuff was then dried.

Yield: 31.6 g=93% of theory.

The dyestuff has the formula

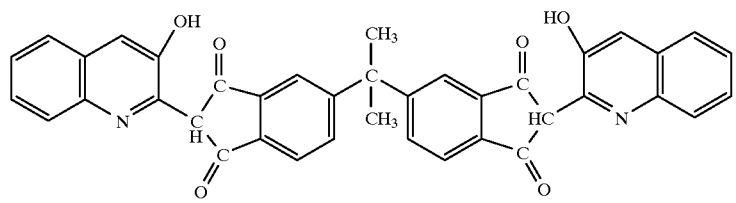

The tinctorial strength of the dyestuff is about 10% higher than that of the same amount of the non-doubled dyestuff of the formula

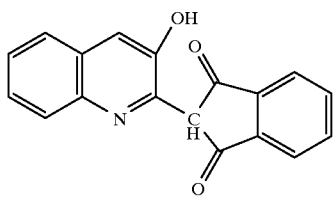

At 400° C., significantly less substance of this dyestuff (determined by TGA) than of the non-doubled dyestuff of the above formula sublimes.

It dyes plastics such as polycarbonate, ABS, polyester and polypropylene in bulk in clear neutral yellow shades with very good fastnesses. Instead of phenol, o-dichlorobenzene, nitrobenzene and ditolyl ether were also employed as the solvent, the same results being achieved.

EXAMPLE 3

26.4 g (0.14 mol) of 3-hydroxyquinaldine-4-carboxylic acid of the formula

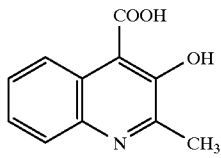

and 18.0 g (0.058 mol) of 4,4'-methylene-diphthalic acid dianhydride were added to 150 ml (1.6 mol) of o-dichlorobenzene, while stirring, and the mixture was heated to 220° C. The reaction was carried out in the course of 12 hours, water of reaction being distilled off and carbon dioxide being split off. Thereafter, the mixture was allowed to cool to 100° C., and 250 ml of methanol were added. After cooling to room temperature, the dyestuff which had crystallized out was filtered off, washed with 250 ml of methanol and then with 500 ml of hot softened water and dried at 70° C. in vacuo.

Yield: 31.7 g=92% of theory.

The dyestuff has the formula

At 300° C., significantly less substance of the dyestuff (determined by TGA) than of the non-doubled dyestuff (see Example 2) sublimes. The tinctorial strength is about 5% higher as compared to the same amount of the non-doubled dyestuff (see Example 2).

EXAMPLE 4

26.4 g (0.14 mol) of 3-hydroxyquinaldine-4-carboxylic acid

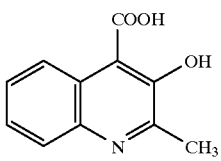

and 26.0 g (0.056 mol) of 4,4'-[2.2.2-trifluoro-1-(trifluoromethyl)-ethylidene]-diphthalic acid anhydride were added to 150 ml (1.6 mol) of o-dichlorobenzene at 80° C., while stirring, and the mixture was heated to 170° C. The reaction temperature was maintained for 12 hours. During this procedure, water of reaction distilled off, and carbon dioxide was split off from the hydroxyquinaldine-carboxylic acid. After 12 hours the mixture was cooled to 100° C. and 250 ml of methanol were added in the course of about 1 hour. After cooling to room temperature, the precipitated crystalline dyestuff was filtered off with suction, washed with 250 ml of methanol, washed with 500 ml of hot softened water and dried at 70° C. in vacuo.

Yield 39.5 g=93% of theory.

The dyestuff has the structural formula

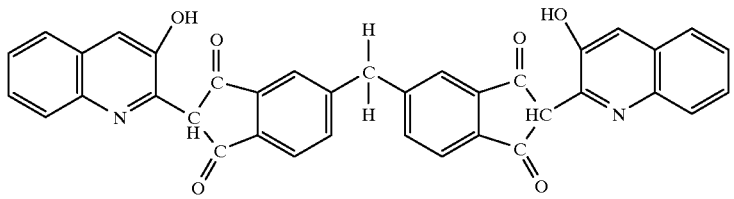

Plastics such as polystyrene, polycarbonate, polyester or polypropylene are dyed in bulk in neutral yellow shades with very good fastnesses.

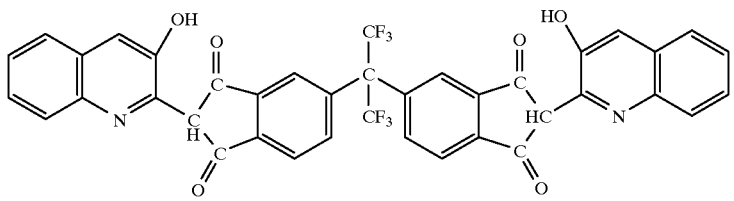

Polystyrene, polycarbonate, polyamide, polyester and ABS were dyed in neutral yellow shades with a high temperature stability and very good fastnesses.

The dyestuff is heat-stable at 400° C. and sublimes to a significantly lesser extent (determined by TGA) than the non-doubled dyestuff (for the formula, see Example 2).

EXAMPLE 5

100 g of polystyrene granules and 0.02 g of the dyestuff from Example 2 were mixed intensively in a drum mixer for 15 minutes. The granules which had been dyed in the dry state were processed on a screw injection moulding machine at 240° C. Transparent yellow sheets of very good fastness to light were obtained. Instead of polystyrene, copolymers with butadiene and acrylonitrile were also used. When 0.5 g of titanium dioxide was additionally added, deep, opaque dyeings were obtained.

EXAMPLE 6

16.8 g of 4,4'-isopropylidene-di-phthalic acid dianhydride and 19.0 g of 1,8-naphthylenediamine were added to 150 ml of o-dichlorobenzene, while stirring. The mixture was heated to 130° C. in the presence of a nitrogen atmosphere and this temperature was maintained for 8 hours. The reaction mixture was then heated at 150° C. for a further 3 hours and subsequently cooled to 80° C., and 150 ml of methanol were added. After further 2 hour at 65–70° C., the mixture was cooled to room temperature and stirred at room temperature for 1 hour and the dyestuff was filtered off. Thereafter, the dyestuff was washed with 100 ml of methanol and then washed with 250 ml of hot water and dried in vacuo at 60° C.

Yield: 27.9 g=96% of theory.

The dyestuff has the structural formula

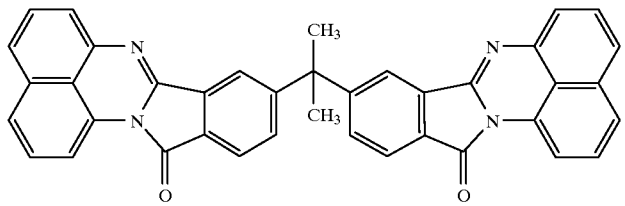

Instead of o-dichlorobenzene, other solvents, such as, for example, o-xylene, phenol, diphenyl ether or ditolyl ether, were also used. The yellowish-tinged orange dyestuff dyes plastics such as polystyrene, polycarbonate, polyester, polyamide, polypropylene or copolymers of acrylonitrile, butadiene and styrene in bulk in temperature-stable dyeings which are fast to sublimation and fast to light.

According to thermogravimetric analysis, a dyestuff loss due to sublimation of only 5% resulted at 400° C. In contrast, in the non-bridged dyestuff of the formula

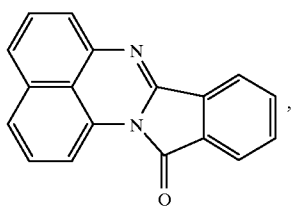

the dyestuff lost due to sublimation under the same conditions was 9%.

EXAMPLE 7

15.4 g of 4,4'-methylenediphthalic acid dianhydride and 16.0 g of 1,8-naphthylenediamine were added to 150 ml of phenol at a temperature of about 80° C. in a nitrogen atmosphere, while stirring. The reaction mixture was heated to 130° C. and kept at this temperature for 8 hours. It was then cooled to 80° C., 250 ml of methanol were added and the mixture was stirred at 60–65° C. for 2 hours. The reaction mixture was cooled to room temperature and then stirred for 1 hour. The dyestuff obtained was filtered off with suction, washed with 100 ml of methanol and 250 ml of hot water and dried in vacuo at 60° C.

Yield: 27 g=93% of theory.

The dyestuff has the formula

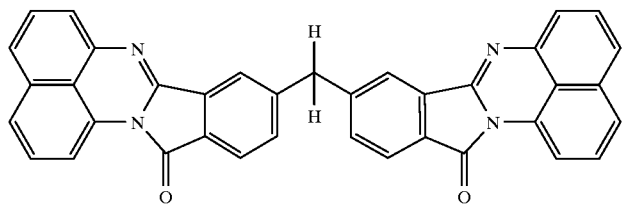

The dyestuff dyed plastics such as polypropylene, polystyrene, polycarbonate, copolymers of polyacrylonitrile, butadiene and styrene in bulk in yellow-orange colour shades. The dyeings are fast to sublimation and have a high fastness to light and high temperature stability. Thermogravimetric analysis of the dyestuff gave a weight loss due to sublimation at 400° C. which was significantly below that of the non-bridged compound already mentioned in Example 6.

EXAMPLE 8

15.4 g of 4,4'-[2,2,2-trifluoro-1-(trifluoromethyl)-ethylidene]-diphthalic acid dianhydride and 16.0 g of 1,8-naphthalenediamine were added to 200 ml of o-dichlorobenzene, while passing nitrogen over the reactants. The mixture was heated to 130° C. and kept at this temperature for 8 hours. The reaction mixture was then cooled to 80° C. and 250 ml of methanol were added. The mixture was stirred at 60–65° C. for 2 hours and then cooled to room temperature. The dyestuff precipitate was filtered off with suction and washed with 100 ml of methanol. It was then washed with 250 ml of hot water and dried in vacuo at 60° C.

Yield: 19.2 g=94% of theory.

The dyestuff has the structural formula

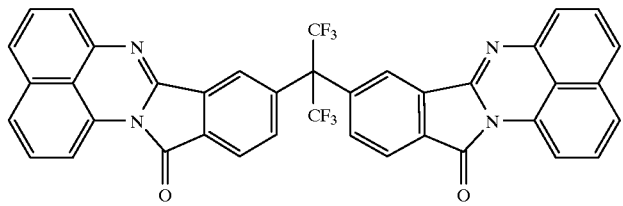

and dyes polyethylene, polypropylene, polystyrene, copolymers of acrylonitrile, butadiene and styrene, polycarbonate and polyester in bulk in yellow-orange shades with very good fastnesses, such as fastness to light, fastness to migration, heat stability and fastness to sublimation.

In a thermogravimetric analysis of this dyestuff at 400° C., a significantly lower loss of substance due to sublimation was to be observed than in the case of the non-bridged dyestuff mentioned in Example 6.

EXAMPLE 9

10.2 g of 3-hydroxyquinaldine-4-carboxylic acid (0.05 mol) and 8.0 g of 1,8-diamino-naphthalene (0.05 mol) and 18.5 g of isopropylidene-bis-phthalic acid anhydride were introduced into 100 g of phenol at 60° C., while stirring. The reaction mixture was then heated to 170 to 175° C. and kept at this temperature for 14 hours. After cooling to 80° C., 350 ml of methanol were added. The dyestuff which had precipitated out was filtered off with suction and washed with methanol and then with hot water. Thereafter, the product was dried at 70° C. in vacuo. The yield was 28.9 g of an orange dyestuff of the formula

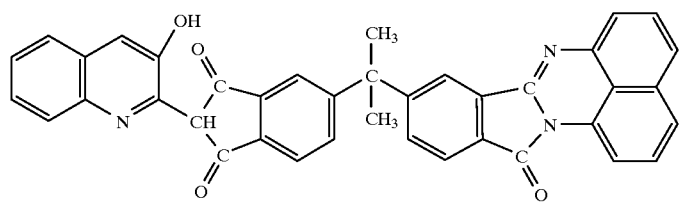

which furthermore comprised approximately the same proportions of the double-sided quinophthalone as of the double-sided perinone, in each dyestuff has an approximately 20% higher tinctorial strength than the double-sided perinone dyestuff. The dyestuff is heat-stable up to 300° C. and has a very good fastness to sublimation at this temperature.

EXAMPLE 10

10.2 g of 3-hydroxyquinaldine-4-carboxylic acid (0.05 mol) were introduced into 100 g of phenol of 60° C. and the mixture was kept at 170° C. for 0.5 hours, while stirring. It was then cooled to 150° C. and 18.5 g of isopropylidene-bis-phthalic acid anhydride (0.055 mol) and 8.0 g of 1,8-diamino-naphthalene were introduced. The temperature was kept at 150° C. for 3 hours and then at 170° C. for 9 hours. The mixture was cooled to 80° C., 350 ml of methanol were added and the dyestuff was filtered off with suction at room temperature and washed with methanol and then with hot water. After drying at 70° C. in vacuo, 32.0 g of a reddish-orange dyestuff were obtained.

The dyestuff has the same composition as that of Example 1.

EXAMPLE 11

7.15 g of quinaldine (0.05 mol) and 8.0 g of 1,8-diaminonaphthalene and 18.5 g of isopropylidene-bis-phthalic acid anhydride were added to 100 g of phenol of 60° C., while stirring. The mixture was then heated to 170 to 175° C. and this temperature was maintained for 10 hours. The mixture was then cooled, 250 ml of methanol were added at 80° C. and the dyestuff which had precipitated out was filtered off with suction. After washing with methanol and hot water, the dyestuff was dried at 70° C. in vacuo. The yield was 25.3 g.

The dyestuff has the formula

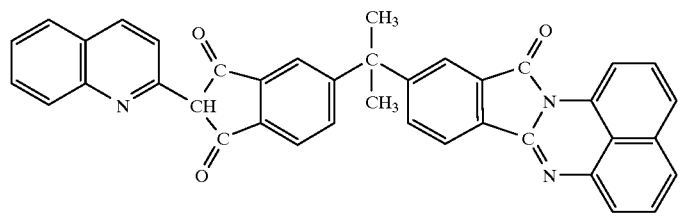

The double-sided quinophthalone dyestuff (10%) and the double-sided perinone dyestuff (10%) were also present in the mixture with this dyestuff. The dyestuff is heat-stable at 300° C. and has a very good fastness to sublimation.

EXAMPLE 12

10.2 g of 3-hydroxyquinaldine-4-carboxylic acid (0.05 mol), 8.0 g of 1,8-naphthylenediamine (0.05 mol) and 15.5 g (0.05 mol) of hexafluoro-iso-propylidene-bis-phthalic acid anhydride were introduce into 100 g of phenol of 60° C., while stirring. The reaction mixture was heated to 170 to 175° C. and kept at this temperature for 14 hours. After cooling to 80° C., 300 ml of methanol were added and the dyestuff which had separated out as crystals was filtered off with suction, washed first with methanol and then with water and dried at 70° C. in vacuo. The yield was 32.9 g. The dyestuff has the formula

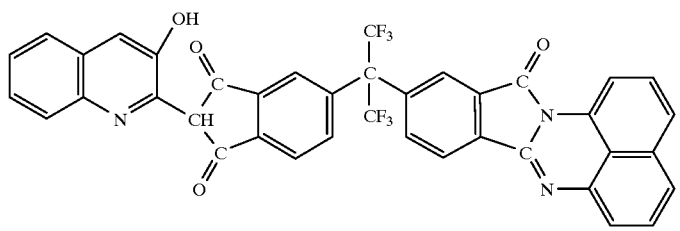

and furthermore comprised approximately equal proportions of in each case 15% of the double-sided quinophthalone and perinone dyestuff. The dyestuff is heat-stable up to 300° C. and has a very good fastness to sublimation at this temperature.

EXAMPLE 13

9.7 g of 3-hydroxy-4-chloro-quinaldine (0.05 mol) of 1,8-naphthylene-diamine (0.05 mol) and 18.5 g of isopropylidene-bis-phthalic acid anhydride were added to 100 g of phenol of 60° C., while stirring. The mixture was then heated to 170 to 175° C. and the temperature was maintained for 12 hours. After cooling to 60° C., the mixture was diluted with 300 ml of methanol and the dyestuff which had precipitated out as crystals was filtered off with suction, washed first with methanol and then with water and thereafter dried at 70° C. in vacuo.

The yield was 27.7 g of an orange-coloured dyestuff of the formula

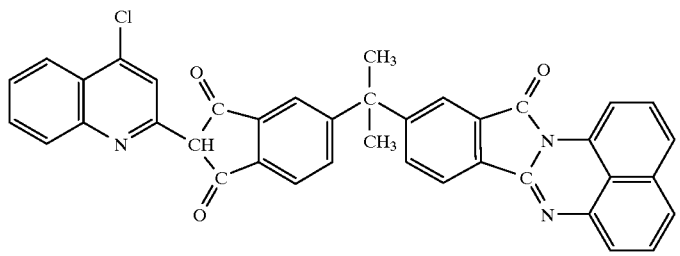

A portion is furthermore also present as the double-sided hydroxy-quinophthalone (10%) and double-sided perinone (10%). The dyestuff is heat-stable up to 300° C. and has a very good fastness to sublimation at this temperature.

EXAMPLE 14

5.1 g of hydroxyquinaldine carboxylic acid (0.025 mol), 4.0 g of 1,8-naphthalenediamine (0.025 mol) and 7.8 g of the ether of 3-hydroxyphthalic acid anhydride (0.025 mol) of the formula

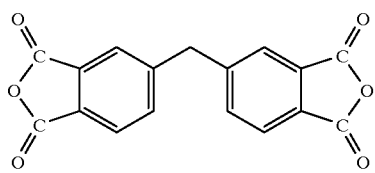

were added to 100 ml of phenol at 60° C. and the mixture was heated to 175° C. This temperature was maintained for 13 hours, during which the water of reaction distilled off 400 ml of methanol were then added at 60° C. and the crystalline dyestuff precipitate was filtered off, washed first with methanol and then with water and thereafter dried.

Yield: 12.5 g

The orange dyestuff has the formula

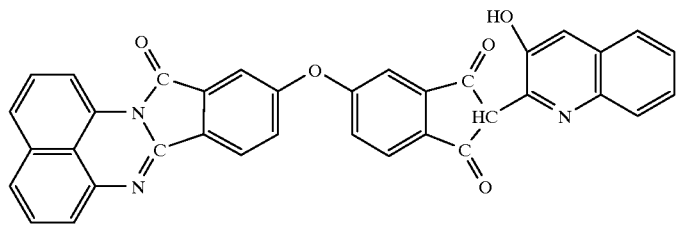

According to thermogravimetric analysis, an excellent fastness to sublimation results even at 400° C.

EXAMPLE 15

20.4 g of hydroxyquinaldinecarboxylic acid (0.1 mol) and 15.6 g of the ether of 3-hydroxyphthalic acid anhydride (0.05 mol) having the formula as in Example 14 were added to 150 ml of phenol, while stirring at 60° C., and the mixture was heated to 175° C. This temperature was maintained for 15 hours. During this operation, water of reaction was distilled off. The mixture was then diluted with 400 ml of methanol at 60° C. and the crystalline dyestuff precipitate was filtered off, washed with methanol and then with water and dried.

Yield: 26.2=88% of theory.

The yellow dyestuff has the formula

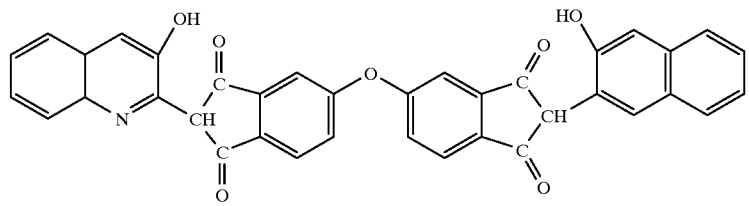

EXAMPLE 16

16 g of 1,8-naphthalenediamine (0.1 mol) and 15.6 g of the ether of 3-hydroxyphthalic acid anhydride (0.05 mol) having the formula as given in Example 14 were added to 150 ml of phenol at 60° C., while passing nitrogen over the reactants and stirring, and the mixture was heated to 175° C. This temperature was maintained for 15 hours, during which water of reaction distilled off. The mixture was then diluted with 400 ml of methanol and the crystalline red dyestuff was filtered off, washed first with methanol and then with water and dried.

Yield: 25.6 g=92% of theory.

The dyestuff has the formula

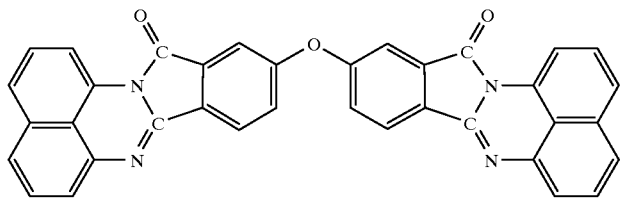

It showed an excellent fastness to sublimation, even at 400° C.

EXAMPLE 17

5.1 g of hydroxyquinaldinecarboxylic acid (0.025 mol), 4.0 g of 1,8-naphthalenediamine (0.025 mol) and 8.5 g of the ester anhydride (0.025 mol) of the formula

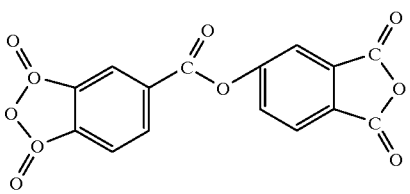

were added to 100 ml of phenol at 60° C. and the mixture was heated to 175° C. and kept at 170–175° C. for 20 hours. During this operation, water of reaction distilled off. The mixture was then allowed to cool to 60° C. and 400 ml of methanol were added. The dyestuff which had crystallized out was filtered off, washed first with methanol and then with water and dried.

Yield: 14.6 g

The dyestuff has the formula

According to methanol were added. The dyestuff which had crystallized out was filtered off, washed first with methanol and then with water and dried.

Yield. 14.6 g

The dyestuff has the formula

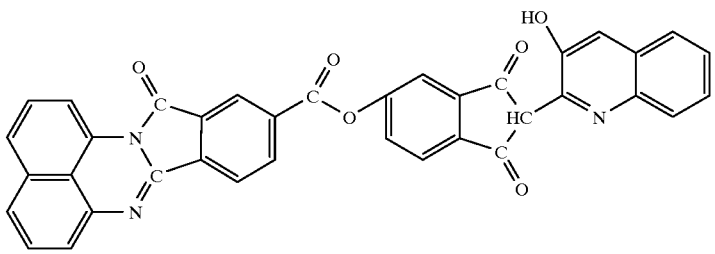

It showed an excellent fastness to sublimation, even at 400° C.

EXAMPLE 18

17 g of the ester anhydride having the formula as in Example 17 (0.05 mol) and 20.4 g of hydroxyquinaldinecarboxylic acid (0.1 mol) were added to 150 ml of phenol at 60° C. and the mixture was heated to 175° C. and stirred at this temperature for 20 hours. During this operation, water of reaction distilled off. Thereafter, the mixture was allowed to cool to 60° C. and 400 ml of methanol were added. The dyestuff which had crystallized out was filtered off, washed first with methanol and then with water and dried.

Yield: 27.3 g=91% of theory.

The dyestuff has the formula

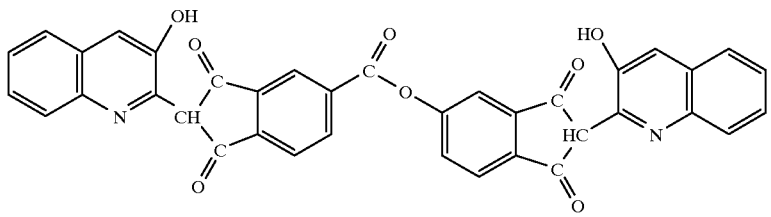

It showed an excellent fastness to sublimation, even at 400° C.

EXAMPLE 19

17 g of the ester anhydride (0.05 mol) (formula as in Example 17) and 16 g of 1,8-naphthalenediamine (0.1 mol) were added to 150 ml of phenol at 60° C., while stirring and passing nitrogen over the reactants, and the mixture was heated to 175° C. and kept at this temperature for 13 hours. During this operation, the water of reaction was distilled off. After cooling to 60° C., 400 ml of methanol were added. The dyestuff which had crystallized out was filtered off, washed first with methanol and then with water and dried.

Yield: 27.1 g=93% of theory.

The red dyestuff has the formula

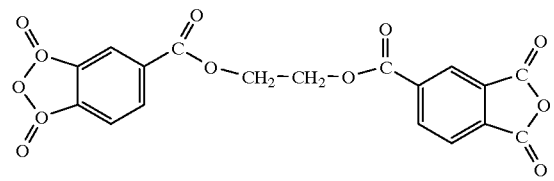

and 8.0 g of 1,8-naphthalenediamine (0.05 mol) were added. The mixture was heated to 175° C. under nitrogen and kept at 170–175° C. for 20 hours. During this operation, water of reaction was distilled off. The mixture was then cooled to 60° C. and 400 ml of methanol were added. The dyestuff which had crystallized out was filtered off, washed with methanol and then with water and dried.

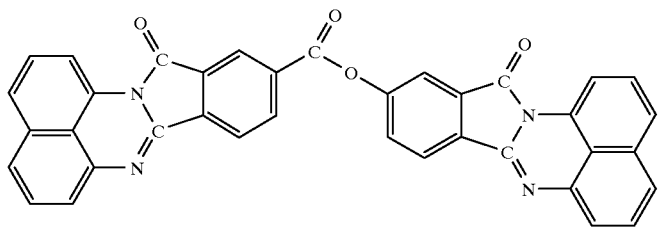

It showed an excellent fastness to sublimation, even at 400° C.

Yield: 29.7 g

The orange dyestuff has the formula

EXAMPLE 20

150 ml of phenol were melted at 60° C. and 10.2 g of hydroxyquinaldine-carboxylic acid (0.05 mol) and 20.5 g of the diester anhydride (0.05 mol) of the formula

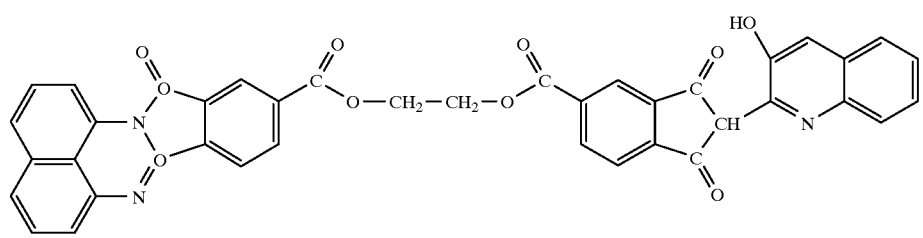

It showed an excellent fastness to sublimation, even at 400° C.

EXAMPLE 21

150 ml of phenol were melted at 60° C. and 20.4 g of hydroxyquinaldine-carboxylic acid (0.1 mol) and 20.5 g of the diester anhydride (0.05 mol) of the formula

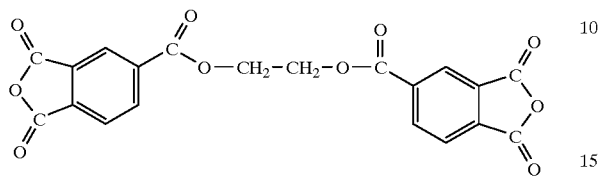

were added. The mixture was heated to 175° C. under nitrogen and kept at this temperature for 20 hours. During this operation, water of reaction distilled off. The mixture was then cooled to 60° C. and the yellow dyestuff was precipitated out with methanol, filtered off, washed with methanol and with water and dried. The dyestuff has the formula

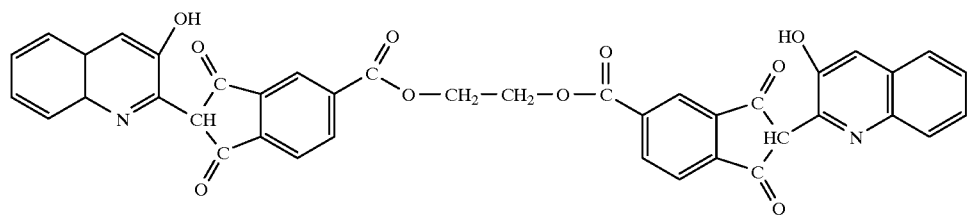

Yield: 30.8 g=89% of theory.

EXAMPLE 22

150 ml of phenol were melted at 60° C. and 16 g of 1,8-naphthalenediamine (0.1 mol) and 20.5 g of diester anhydride (0.05 mol) of the formula

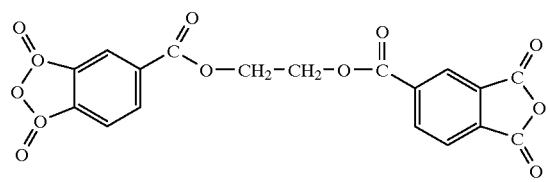

were added. The mixture was heated to 175° C. under nitrogen and kept at this temperature for 20 hours. During this operation, water of reaction distilled off. The mixture was then cooled to 60° C. and the red dyestuff was precipitated out with methanol, filtered off, washed with methanol and with water and dried. The dyestuff has the formula

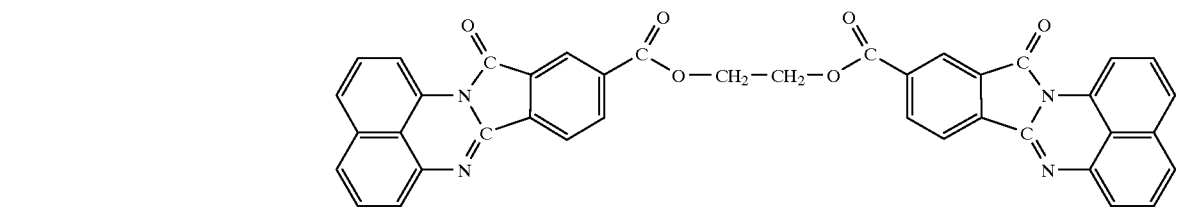

Yield: 30.3 g=92% of theory.

It showed an excellent fastness to sublimation, even at 400° C.

DYEING EXAMPLE 100 g of polypropylene granules and 0.1 g of the dyestuff from Example 21 were mixed in a drum mixer for 15 minutes, with the addition of a few drops of propylene glycol as an adhesion promoter. The polypropylene granules covered on the outside with dyestuff were then processed at 280° C. on a screw injection moulding machine. Transparent yellow sheets of very good fastness to light were obtained. The dyeings show no bleeding. When 2% of titanium dioxide was also additionally added to the dyestuff, deep opaque dyeings were obtained.

What is claimed is:

1. A compound of the formula (I) or a tautomeric form thereof

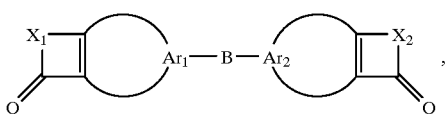 (I)

wherein

Ar$_1$ and Ar$_2$ independently of one another denote radicals to complete unsubstituted carbocyclic aromatic rings or carbocyclic aromatic rings substituted with one or more C$_1$–C$_6$-alkyl, halogen, alkylcarbonyl, phenylcarbonyl, alkylsulphonyl, phenylsulphonyl, nitro, phenyl, naphthyl, phenyloxysulphonyl, hydroxyl, C$_1$–C$_6$-alkoxy, aryloxy, amino, alkyl-substituted amino, acetylamino, aminosulphonyl, alkyl-substituted aminosulphonyl, or phenyl-substituted aminosulphonyl, denotes straight-chained or branched C$_1$–C$_5$ alkylene, C$_1$–C$_5$ alkylene substituted with one or more CF$_3$ groups, or a radical of the formula

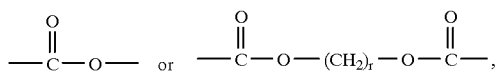

wherein r represents a number from 1 to 4, said group B being bonded to aromatic carbon atoms of Ar$_1$ and Ar$_2$, and X$_1$ and X$_2$ independently of one another represent a radical of the formula

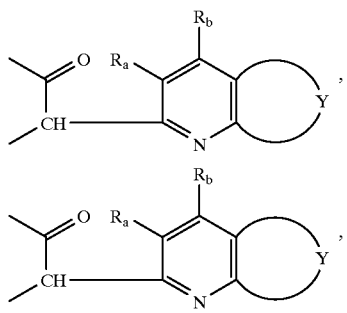

located in the ring such that the >C=O group of each X$_1$ and X$_2$ is adjacent to a carbon-carbon double bond of formula (I), wherein Y forms the radical of a benzene ring or a naphthalene ring, said benzene ring or naphthalene being optionally substituted with one or more halogen, —COOH, —COOR in which R is C$_1$–C$_{10}$-alkyl, phenyl, naphthyl, C$_5$–C$_8$-cycloalkyl, or C$_1$–C$_6$-alkyl, R$_a$ denotes H or OH, and R$_b$ denotes H or halogen.

2. The compound according to claim 1, wherein Ar$_1$ and Ar$_2$ independently of one another denote a radical for completion of an unsubstituted or substituted benzene or naphthalene ring.

3. The compound according to claim 1, wherein Ar$_1$ and Ar$_2$ independently of one another denote a radical for completion of an unsubstituted or substituted benzene ring.

4. The compound according to claim 1, which corresponds to the formula (II) or a tautomeric form thereof

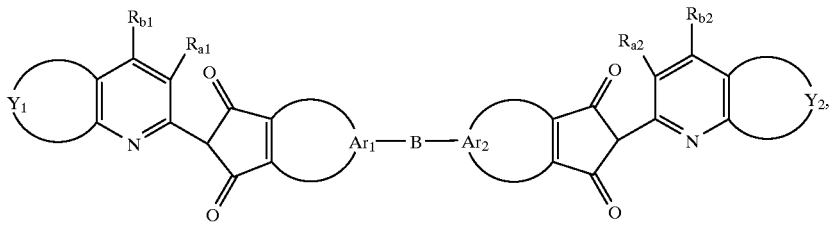 (II)

wherein

Y$_1$ and Y$_2$ independently of one another form the radical of an unsubstituted or substituted benzene or naphthalene ring, R$_{a1}$ and R$_{a2}$ independently of one another denote H or OH, and R$_{b1}$ and R$_{b2}$ independently of one another denote H or halogen.

5. The compound according to claim 4, wherein R$_{b1}$ and R$_{b2}$ independently of one another denote H or F, Br or Cl.

6. The compound according to claim 1, wherein B is an unsubstituted or substituted C$_1$–C$_5$-alkylene group or a radical of the formula

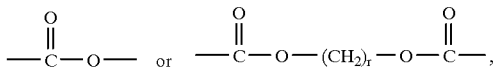

where r=2 to 4.

7. The compound according to claim 1, wherein B represents a radical of the formulae

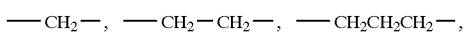

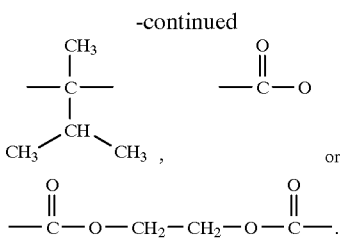

8. The compound according to claim 4, wherein
$Y_1 = Y_2$
$R_{a1} = R_{a2}$
$R_{b1} = R_{b2}$ and
$Ar_1 = Ar_2$.

9. The compound according to claim 4, which corresponds to the formula (IIa) or a tautomeric form thereof n and m independently of one another represent a number from 0 to 4, $R_1$ and $R_2$ independently of the one another are in each case identical or different and denote Cl, Br, —COOH, —COOR (wherein R represents methyl or ethyl), phenyl, $C_5$–$C_8$-cycloalky, or methyl, o and p independently of one another represent a number from 0 to 1, $R_3$ and $R_4$ independently of one another are in each case identical or different and denote methyl, ethyl, n-propyl, iso-propyl, or n-, sec- or tert-butyl, Cl, Br, alkyl- or phenylcarbonyl, alky- or phenylsulphonyl, nitro, unsubstituted or substituted phenyl, —$SO_2OC_6H_5$, hydroxyl, methoxy, benzyloxy, phenoxy, $NH_2$, $NHCOCH_3$, —$N(C_2H_5)_2$, $SO_2N(CH_3)_2$, $SO_2NHCH_3$, or a fused-on cycloaliphatic or heterocyclic ring, $R_a1$ and $R_a2$ independently denote H or OH, and $R_b1$ and $R_b2$ independently denote H or halogen.

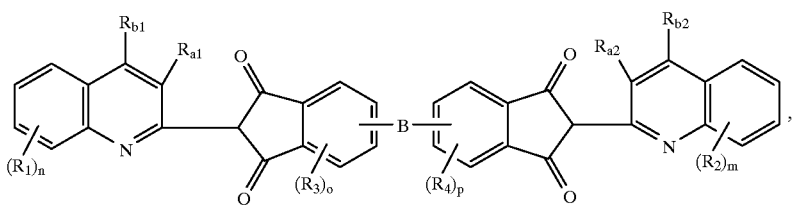

(IIa)

wherein
n and m independently of one another represent a number from 0 to 4, $R_1$ and $R_2$ independently of one another are in each case identical or different and denote halogen, —COOH, —COOR wherein R represents $C_1$–$C_{10}$-alkyl, phenyl, $C_5$–$C_8$-cycloalkyl, or $C_1$–$C_6$-alkyl, o and p independently of one another represent a number from 0 to 2, $R_3$ and $R_4$ independently of one another are in each case identical or different and denote $C_1$–$C_6$-alkyl, halogen, alkyl- or phenylcarbonyl, alkyl- or phenylsulphonyl, nitro, phenyl, phenoxysulphonyl, hydroxyl, $C_1$–$C_6$-alkoxy, benzyloxy, phenoxy, amino which is unsubstituted or substituted by alkyl or acetyl, or aminosulphonyl which is unsubstituted or substituted by alkyl or phenyl, $R_a1$ and $R_a2$ independently denote H or OH, and $R_b1$ and $R_b2$ independently denote H or halogen.

10. The compound according to claim 4, which corresponds to the formula (IIa) or a tautomeric form thereof 11. The compound according to claim 9, wherein
n=m
$R_1 = R_2$
$R_{a1} = R_{a2}$
$R_{b1} = R_{b2}$
o=p and
$R_3 = R_4$.

12. The compound according to claim 9, wherein
n=m
$R_1 = R_2$
$R_{a1} = R_{a2}$
$R_{b1} = R_{b2}$
o=p and
$R_3 = R_4$
wherein n, m o and p represent 0.

13. The compound according to claim 9, which corresponds to the formula (IIb) or a tautomeric forms thereof

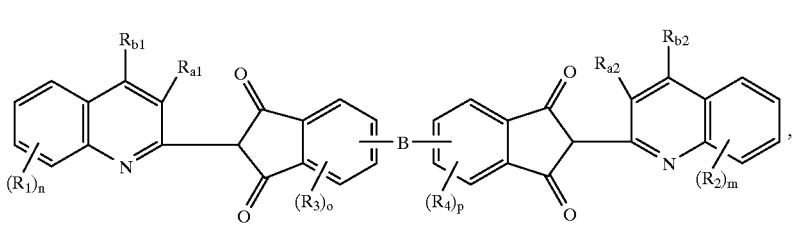

(IIa)

wherein

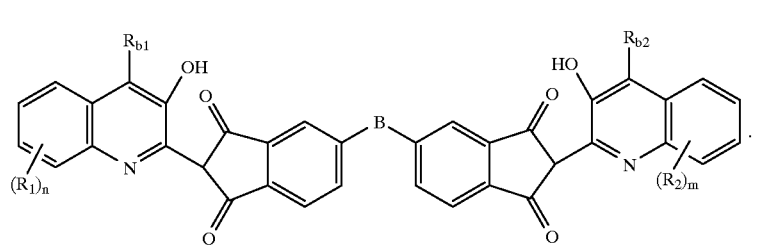
* * * * *

UNITED STATES PATENT AND TRADEMARK OFFICE
CERTIFICATE OF CORRECTION

PATENT NO. : 5,955,614
DATED : September 21, 1999
INVENTOR(S) : Dietmar Kalz, Dieter Arlt and Karl-Heinz Reinhardt It is certified that error appears in the above-identified patent and that said Letters Patent is hereby corrected as shown below:

Column 37,
Line 35, replace "aminosulphonyl, denotes straight-chained or branched" with
-- aminosulphonyl,
B denotes straight-chained or branched --

Signed and Sealed this

Nineteenth Day of November, 2002

Attest:

Attesting Officer

JAMES E. ROGAN
Director of the United States Patent and Trademark Office